(12) United States Patent
Tilfors et al.

(10) Patent No.: US 6,405,180 B2
(45) Date of Patent: *Jun. 11, 2002

(54) AUTOMATED EXCHANGE FOR MATCHING BIDS BETWEEN A PARTY AND A COUNTERPARTY BASED ON A RELATIONSHIP BETWEEN THE COUNTERPARTY AND THE EXCHANGE

(75) Inventors: Jan Tilfors, Stockholm (SE); Gary Katz, Plainview, NY (US)

(73) Assignee: International Securities Exchange, LLC, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/186,154

(22) Filed: Nov. 5, 1998

(51) Int. Cl.7 .............................................. G06F 17/60
(52) U.S. Cl. .............................. 705/37; 705/35; 705/36
(58) Field of Search ............................ 705/37, 35, 400, 705/36, 38, 39; 364/408, 479.8, 768

(56) References Cited

U.S. PATENT DOCUMENTS

| | | | |
|---|---|---|---|
| 3,573,747 A | 4/1971 | Adams et al. | 340/172.5 |
| 3,581,072 A | 5/1971 | Nymeyer | 235/152 |
| 4,412,287 A | * 10/1983 | Braddock, III | 705/37 |
| 4,674,044 A | * 6/1987 | Kalmus et al. | 705/37 |
| 4,903,201 A | 2/1990 | Wagner | 364/408 |
| 4,980,826 A | 12/1990 | Wagner | 364/408 |
| 5,101,353 A | 3/1992 | Lupien et al. | 364/408 |
| 5,136,501 A | * 8/1992 | Silverman et al. | 705/37 |
| 5,297,032 A | 3/1994 | Trojan et al. | 364/408 |
| 5,305,200 A | * 4/1994 | Hartheimer et al. | 705/37 |
| 5,664,115 A | * 9/1997 | Fraser | 705/37 |
| 5,689,652 A | 11/1997 | Lupien et al. | 395/237 |

(List continued on next page.)

FOREIGN PATENT DOCUMENTS

EP 952536 A1 * 10/1999 .......... G06F/17/60

OTHER PUBLICATIONS

Eric K. Clemons, Segmentation, Differentiation, and flexibility Pricing: Experience With Information Technology and Segment–Tailorted Strategies.*
Squeezing The Poor, Guardian, p. 18, Feb. 1997.*
Gavin Souter, Bermuda's reinsurers eager to please,Business Insurance. pp 77, Oct. 1994.*
La Libre Competencia Sacude a las Electricas, SPAIN: Free–For_all In Electric Sector, Actualidad Economica, p. 18, Sep. 1996.*

*Primary Examiner*—Eric W. Stamber
*Assistant Examiner*—Raquel Alvarez
(74) *Attorney, Agent, or Firm*—Orrick, Herrington & Sutcliffe LLP (57) ABSTRACT

In an automated exchange system means are provided by means of which a market maker can enter a course of action in advance, so that the volume in the orderbook is continuously updated, and where the updating is performed differently with respect to different counter parts. Also, quotes that may result in a trade between Market Makers are hidden for some time before being matched, thus giving the Market Makers a chance to back off. The system employs a function that supports that Market Makers through pre-defined parameters will have new orders generated by the system and that a market maker can act differently with respect to different counterparts. The parameters specify if a Market Maker should add extra volume on an existing price or generate a new order at a worse price. In order to make it possible for market makers to have a very tight spread without forcing them to take larger risks, additional logic is used when matching orders. The algorithm used for this purpose protects the market makers in certain situations and gives market makers the possibility to have a tight spread without taking a large risk. The algorithm also supports that the market makers can take the risk to quote large volumes.

11 Claims, 6 Drawing Sheets

U.S. PATENT DOCUMENTS

| | | | | |
|---|---|---|---|---|
| 5,715,402 A | * | 2/1998 | Popolo | 705/37 |
| 5,787,402 A | * | 7/1998 | Potter et al. | 705/37 |
| 5,905,974 A | * | 5/1999 | Fraser et al. | 705/37 |
| 5,913,202 A | * | 6/1999 | Motoyama | 705/35 |
| 5,970,479 A | * | 10/1999 | Shepherd | 705/37 |
| 5,978,779 A | * | 11/1999 | Stein et al. | 705/37 |
| 6,035,288 A | * | 3/2000 | Solomon | 705/37 |
| 6,076,068 A | * | 6/2000 | DeLapa et al. | 705/14 |
| 6,317,727 B1 | * | 11/2001 | May | 705/37 |

* cited by examiner

AUTOMATED EXCHANGE FOR MATCHING BIDS BETWEEN A PARTY AND A COUNTERPARTY BASED ON A RELATIONSHIP BETWEEN THE COUNTERPARTY AND THE EXCHANGE

TECHNICAL FIELD

The present invention relates to a method and a system for increasing the security against undesired matches in an automated exchange system.

BACKGROUND OF THE INVENTION AND STATE OF THE ART

In existing automated exchange systems for continuous trading (dealer market), a simple first in first served model in the matching is commonly used. Thus, if there is a selling price, which is matched by a buying price, the two orders are matched.

To increase liquidity there are Market Makers (quoters) who are required by the exchange to continuously enter two way quotes. The basic idea is that market makers must have a two way quote in the market all the time. The quotes (together with ordinary orders) creates a best bid and offer that is sent out as the exchange official price. The best bid or offer is used by investors when deciding about buying or selling an instrument. It is in the exchange interest to have as tight spread, i.e. the small difference between the selling price and the buying price, as possible between the best bid and the best offer in order to attract investors. It is also in the exchange interest to have a lot of volume (many contracts) available to the investors, both at the best bid and offer and at a worse price.

In other words, since a market maker is required to continuously have a two way quote, i.e. both a selling price and a buying price, if the price goes up (or down) the market makers will adjust their prices. However, if there is a delay in the communication path between a market maker and the automated exchange system or a market maker is slow to enter his new prices into an existing automated system the system will automatically match bids, even though this never was the intention of the market maker only being slow to enter his new prices or the new prices having been delayed for some reason.

In today's automated exchange systems the market makers solve this problem by having quite a large spread, i.e. a large difference between their selling price and their buying price.

Thus, if the prices on the market starts to change, the market maker has a buffer in that he has entered a large spread, and he will thus have more time to correct his prices.

However, as pointed out above, it is in the exchange interest to have as tight spread as possible between the best bid and the best offer in order to attract investors. Therefore, it is desired that the spread be smaller than it is today, without forcing the market makers to take the risk of making undesired matches.

Furthermore, today's automated exchange systems does not support that market makers act differently with respects to different counterparts or types of counterparts.

SUMMARY

It is an object of the present invention to overcome the problems as outlined above and to provide an automated exchange system having functionality which makes it possible for market makers to act differently with respect to different counterparts and which therefore can cope with situations where matching bids should not be matched, and thereby making it possible for market makers to enter two way quotes having a very small spread without taking the risk of making undesired matches.

This object and others are obtained by a method and a system wherein a market maker can enter a course of action in advance, so that the volume in the orderbook is continuously updated, and where the updating is performed differently with respect to different counter parts. Also, quotes that may result in a trade between market makers are hidden for some time before being matched, thus giving the market makers a chance to back off.

Thus, the system employs a function that supports that market makers through pre-defined parameters will have new orders automatically generated by the system and that a market maker can act differently with respect to different counterparts. The parameters specify if a market maker should add extra volume on an existing price or generate a new order at a worse price.

Thus, in order to support market makers to have a very tight spread additional logic is used when matching orders. The algorithm used for this purpose protects the market makers in certain situations and gives market makers the possibility to have a tight spread without taking a large risk. The algorithm also supports that the market makers can take the risk to quote large volumes.

The algorithm uses a set of parameters, which are pre-defined by each market maker. The parameters are for example:

Firm limit parameter, which restricts how much of a quote may be traded against a firm order or a market maker order/quote.

Step-up buffer parameter, which is used for determining when to increase the volume on the market.

Tick worse volume parameter, which is used for automatically placing new quotes on the market.

The algorithm is executed when a market maker participates in a trade. In a preferred embodiment there are three different methods in the algorithm depending on the counterpart in the trade Thus, when the counterpart is a customer the market maker participates in the trade with the full volume.

If the market maker full volume at the best price is traded, and the customer order indicates that it wants to trade more (volume and price indicates further matching) the tick worse parameter generates new quotes in accordance with an algorithm described below.

When the trade is executed a check is done of the total volume at the best bid/offer. If the volume is less than X, which is a parameter predefined by the exchange, the step-up parameter is used to automatically generate more volume in the market makers existing quote. If the parameter indicates to not generate more volume the tick one worse parameter instead generates new quotes.

When the counterpart is a firm the market maker participates in the trade with the firm volume. This supports that the market maker can have reduced volume (risk) when trading with firms.

If the market maker firm volume at the best price is traded, and the firm order indicates that it want to trade more (volume and price indicates further matching) the tick one worse parameter generates new quotes.

When the trade is executed a check is done of the total volume at the best bid/offer. If the volume is less than X, which is a parameter predefined by the exchange, the step-up parameter is used to automatically generate more volume in the marketmaker's existing quote. If the parameter indicates to not generate more volume the tick one worse parameter instead generates new quotes.

When the counterpart is a market maker no match takes place. Instead the incoming order is inserted into the order book but no update of the best bid offer is sent out, i.e. now there are quotes in the order book crossing but it is not sent out in the best bid/offer. After a time Y, which is predefined by the exchange, the algorithm checks if there still is a lock, i.e. matching prices, in the order book, and if so the orders are matched.

If the counterpart is another market maker, the market maker participates in the trade with the firm volume. This supports that market makers do not take the risk to trade with other market makers just because they are a bit slow to send in new quotes. This also supports that the market maker can have reduced volume (risk) when trading with other market makers.

If the market maker full volume at the best price is traded, and the opposite market maker quote indicates that it wants to trade more (volume and price indicates further matching) the one tick worse parameter generates new quotes.

The method and system as described herein makes it possible for a market maker to act differently with respect to different counterparts. This makes the risks which the market maker has to take lower, and therefore the market maker can reduce the spread, which in turn will increase the attraction on investors.

BRIEF DESCRIPTION OF THE DRAWINGS

The present invention will now be described by way of non-limiting examples and with reference to the accompanying drawings, in which.

DESCRIPTION OF PREFERRED EMBODIMENTS

In the following description, being given as an example only, the following definitions will be used:

A market maker is defined to be a market maker for certain financial instruments.

When a market maker sends in prices to the order book in instruments where he is a market maker the prices are sent in as quotes. Quotes are always limit order that will be stored in the book if not matched.

Quotes can only be used by market maker members in instruments where they are defined as market makers.

When a market maker trades in series (instruments) where he is not defined as a market maker he is, in the examples given below, considered to be a firm. He can then only send in orders. Furthermore, the system as described below is assumed to have the following characteristics:

A user can insert one transaction at a time.

A transaction is returned with status, i.e. success or error.

Only one transaction at a time is handled within one orderbook.

Furthermore, in the following examples the terms "firm" and "customer" are used for private investors and professional investors, respectively. However, additional or other types of investors are also possible, the following description only being an example.

Figure 1:
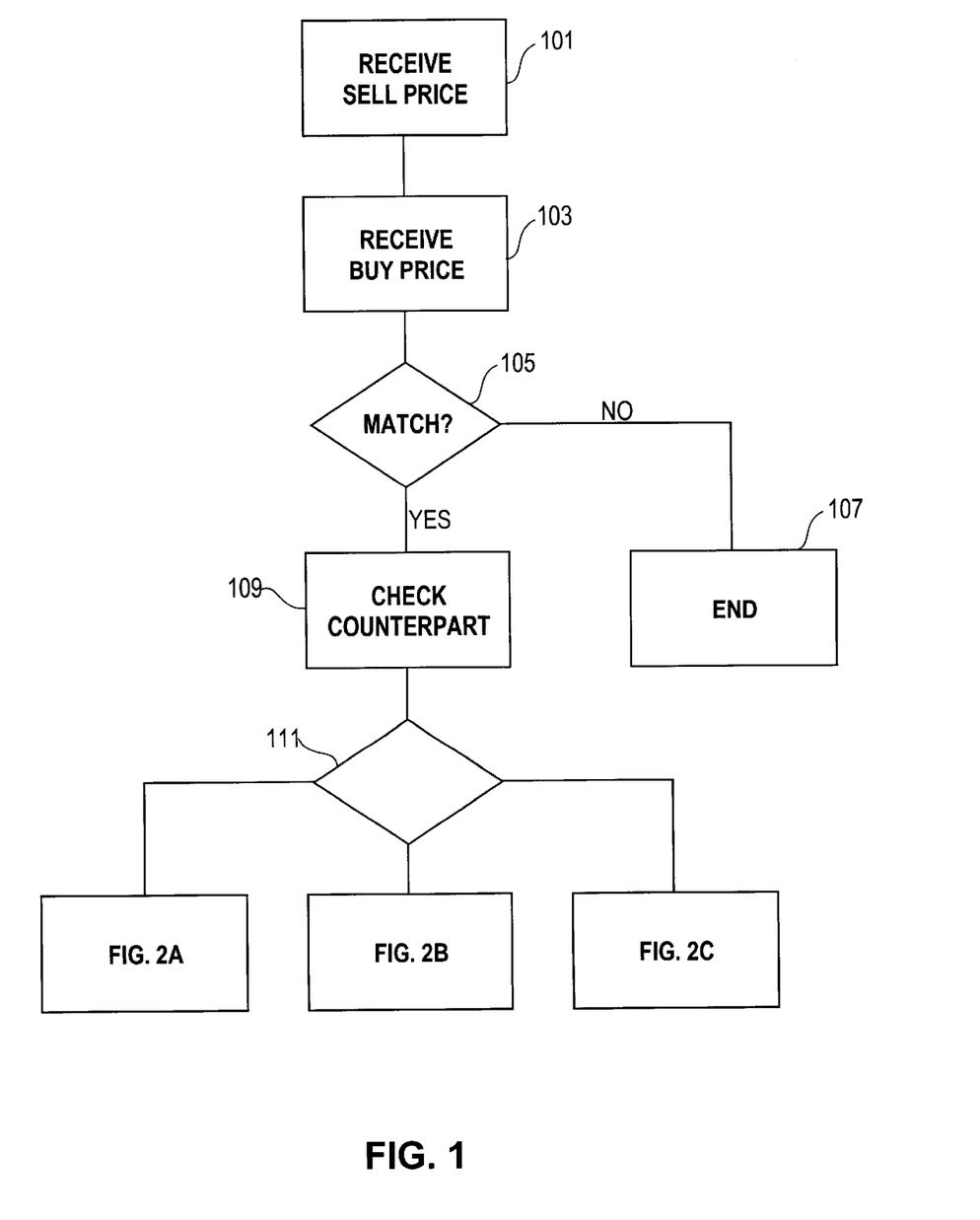
FIG. 1 is a flow chart illustrating the basic steps carried out in an automated exchange system.

In FIG. 1, a general flow chart illustrating some basic steps in an automated exchange system is shown. In the example described below it is assumed that the person selling is a market maker and that the type of counterpart is known by the system. Thus, first, in a step 101, a selling price is received from the market maker. Next, in a step 103 a buying price is received. Thereupon, in a step 105, it is checked if the received selling and buying prices match. If this is the case the procedure proceeds to a step 109, and else the procedure ends in a step 107. In the step 109 it is decided which type of person has entered the buying price, e.g. a customer, a firm or another market maker.

Figure 2A:
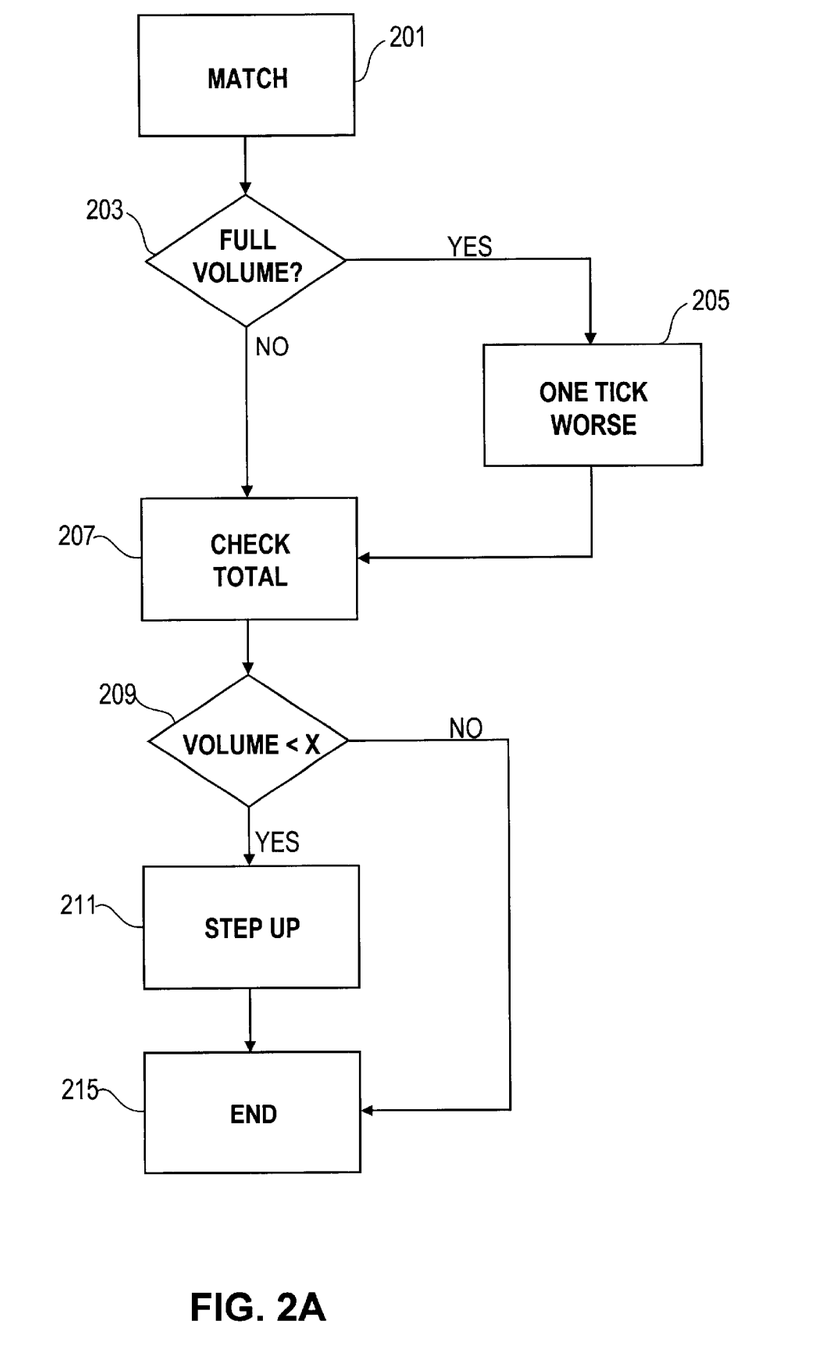
FIGS. 2a–c are flow charts illustrating some of the steps carried out when matching two bids in an automated exchange system for different types of counterparts.
Figure 2B:
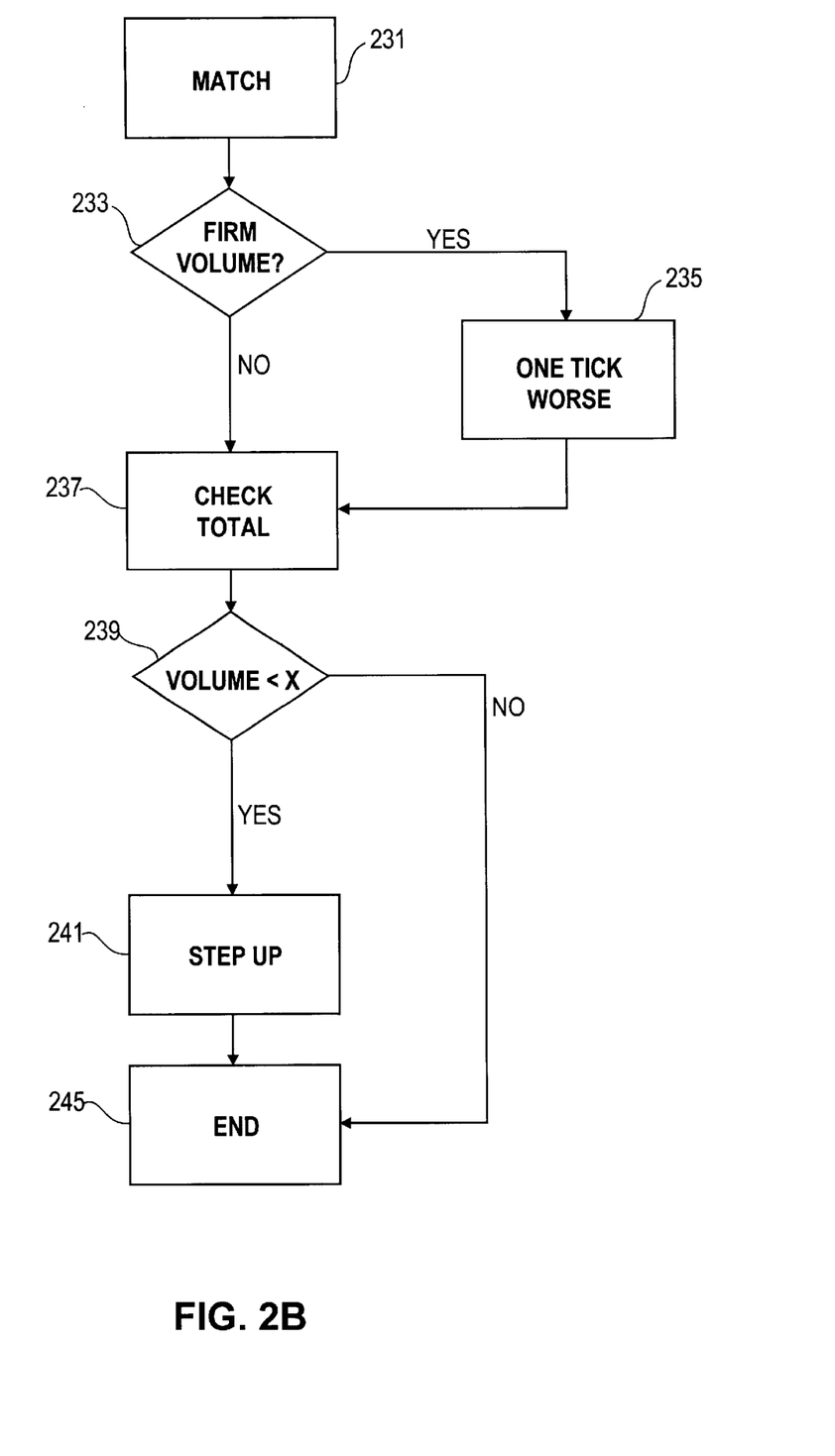
Figure 2C:
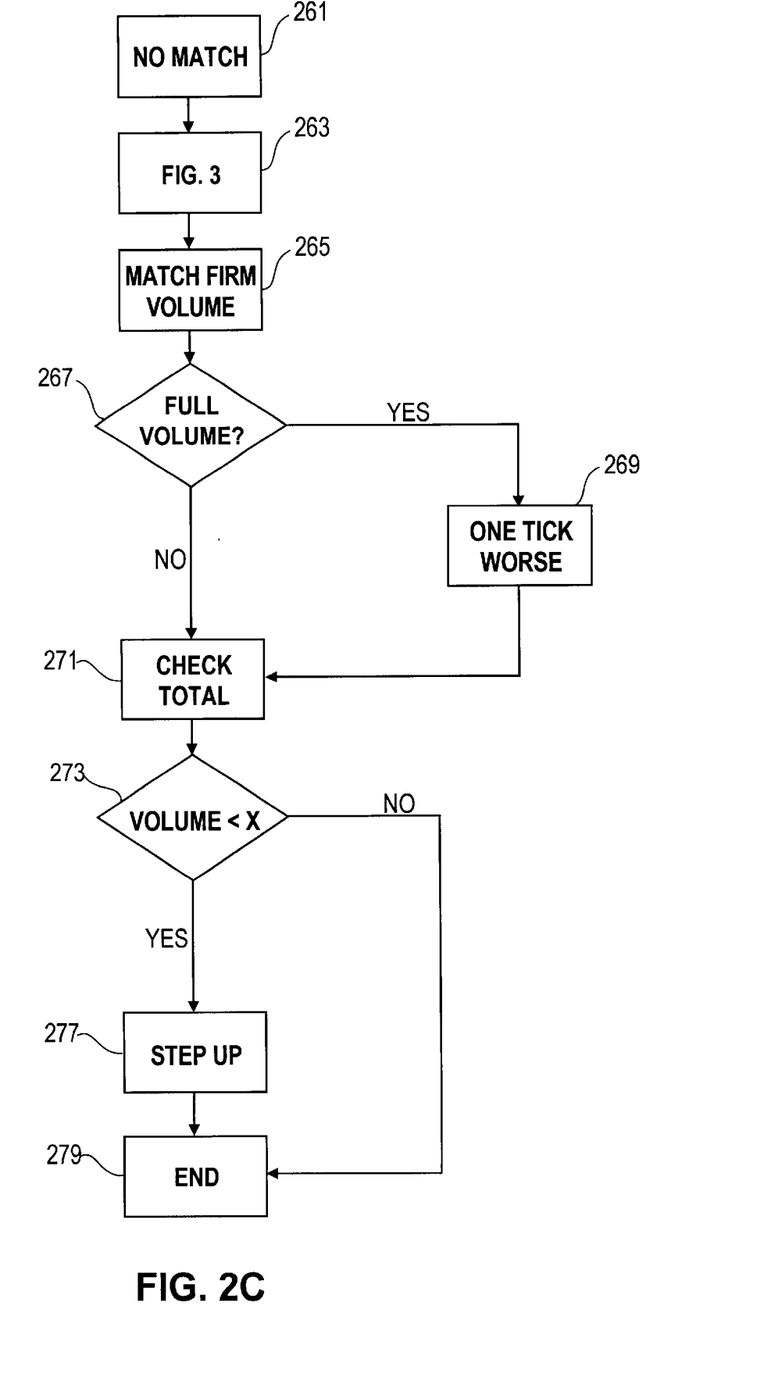

Depending on the type of investor that has entered the buying price the automated exchange system selects different matching methods. Thus, in a step 111, the type of counterpart is decided. If the counterpart is a customer the system selects a first matching method as illustrated in FIG. 2a. If the counterpart is a firm the system selects a second method as illustrated in FIG. 2b. If the counterpart is a market maker the system selects a third method as illustrated in FIG. 2c.

In FIG. 2a the procedure when matching between a selling market maker and a buying customer is illustrated. When the counterpart is a customer the matching always take place as is indicated in step 201. The market maker participates in the trade with the full volume.

If the market maker full volume at the best price is traded, and the customer order indicates that it wants to trade more (volume and price indicates further matching), step 203, the one-tick-worse rule as described below is executed, step 205, and else the procedure proceeds directly to a step 207.

When the trade is executed a check is done of the total volume in the orderbook at the best bid/offer, step 207. If the total volume in the orderbook is found to be less than X, in step a 209, where X is a parameter predefined by the exchange, the step-up parameter, as described below, is used to automatically generate more volume in the market maker's existing quote, step 211. If the parameter indicates to not generate more volume the procedure proceeds directly to a step 215. Finally, the matching procedure ends in a step 215.

However, in a preferred embodiment, the step 211 can be executed in the following manner (not shown). If the total volume is only a little smaller than the volume required by the exchange, the step up parameter is used to automatically generate more volume at the current price. If, on the other hand, a larger volume needs to be generated in order to obtain the volume X, the one tick worse parameter is used to generate the requested volume at a worse price. Also, if in the step 211, the step up parameter has been used to generate more volume a number of consecutive times at the same price, the one tick worse parameter can be used, even though the step-up parameter normally should have been used. This will prevent that a customer enters a large number of small orders and that the system then generates more volume at the current price instead of offering a worse price as would have been the case if the customer had entered one large order.

In FIG. 2b, the procedure when matching between a selling market maker and a buying firm is illustrated. When the counterpart is a firm the matching always take place as indicated in step 231. However, the market maker participates in the trade with a firm volume, usually being smaller than the full volume and which can be set by the market maker in the system. This supports that the market maker can have reduced volume (risk) when trading with firms.

Next, in a step 233, it is checked if the market maker firm volume at the best price is traded, and if the firm order indicates that it wants to trade more (volume and price indicates further matching) the one-tick-worse rule, as described below, is executed, step 235, and else the procedure proceeds directly to a step 237.

When the trade is executed a check is done of the total volume at the best bid/offer, step 237. If the volume is found to be less than X, in a step 239, where X is a predefined parameter by the exchange, the step-up parameter, as described below is used to automatically generate more volume in the market makers existing quote, step 241. If the parameter indicates to not generate more volume the procedure proceeds directly to a step 245. Finally, the matching procedure ends in the step 245.

However, in a preferred embodiment, the step 241 can also be executed as described above in conjunction with step 211.

In FIG. 2c, the procedure when matching between a selling market maker and a buying market maker is illustrated. When the counterpart is a market maker, in particular a market maker quote, no match takes place. Instead the incoming order/quote is inserted into the order book but no update of the best bid offer is sent out, i.e. now there are quotes in the order book crossing or locking, but it is not sent out in the best bid/offer, step 261. Both these orders can however trade against another order. After a time Y (predefined by the exchange) the algorithm checks if there still is a lock in the order book, step 263. An algorithm for this is described below in conjunction with FIG. 3.

If there is the market maker participates in the trade with the firm volume, step 265. This supports that the market maker can have reduced volume (risk) when trading with other market makers.

Next, in a step 267, it is checked if the market maker firm volume at the best price is traded, and the opposite market maker quote indicates that it wants to trade more, i.e. volume and price indicates further matching. If this is the case, the one-tick-worse rule as described below is executed, step 269.

When the trade is executed a check is done of the total volume at the best bid/offer, step 271. If the volume is found to be less than X, in a step 273, where X is a predefined parameter by the exchange, the step-up parameter, as described below is used to automatically generate more volume in the market makers existing quote, step 277. If the parameter indicates to not generate more volume the procedure proceeds directly to a step 279. Finally, the matching procedure ends in the step 279.

However, the step 277 can also be executed as described above in conjunction with step 211.

Figure 3:
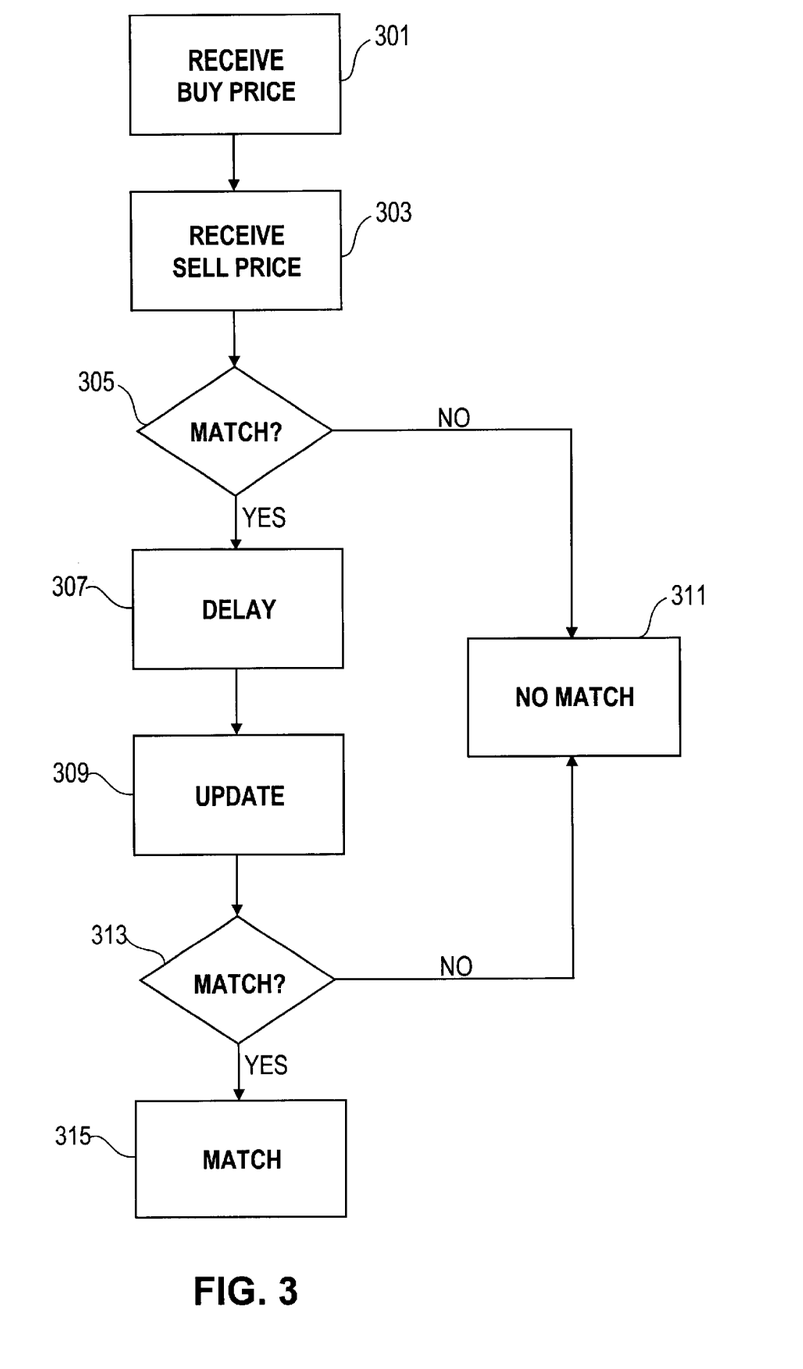
FIG. 3 is a flow chart illustrating steps carried out in a matching procedure between two market makers.

In FIG. 3, a procedure for executing an algorithm for matching prices between two market makers is shown. The algorithm as shown in FIG. 3 can for example be used when executing the step 263 as described above. Thus, first in a step 301 the buy price is received. Next, the sell price is received, step 303. Thereupon it is checked if there are matching orders, step 305. If the outcome of step 305 is yes then wait a short time, e.g. 2 s, step 307, else the procedure proceeds to step 311.

When the short time has elapsed, the prices are updated, step 309. Thereupon, a new check is executed for checking if there are still matching prices, step 313. If this is not the case the procedure proceeds to step 311 where it is decided not to match, else the procedure proceeds to a step 315 where a match takes place.

In a preferred embodiment, if in the step 305 matching prices are established, the marker makers having the matching offers are marked, and a match only takes place if the same, marked marker makers still wants to trade in step 313.

The step 307, can also be repeated a number of times and if the outcome is the same all of the times the match is made in order to even further reduce to risk of making undesired trades.

This supports that market makers do not take the risk to trade with other market makers just because there is a small delay in the system or because they are a bit slow to send in new quotes.

Figure 4:
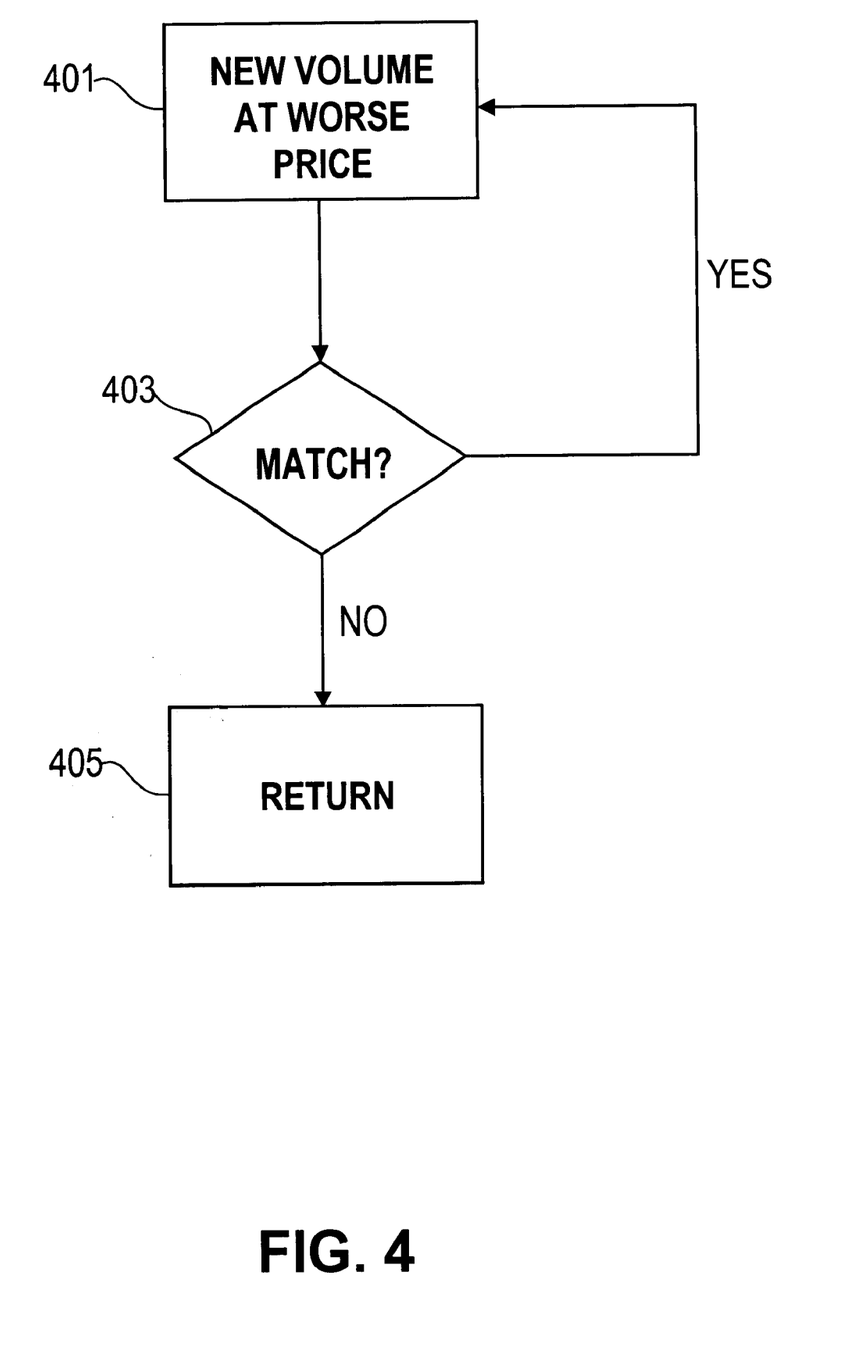
FIG. 4 is a flow chart illustrating different steps carried out when executing the one tick worse rule.

In FIG. 4, a procedure for executing the one tick worse rule is shown. The one tick worse rule uses a number of different parameters in order to automatically generate new orders if the volume at a particular price is traded in one single transaction.

Thus, first when a quote has been traded the one-tick worse rule checks the next one tick worse parameter to see the volume the market maker has specified, step 401. The volume and price specified by the first one tick worse parameter is used in the matching. If further trade is still indicated in a step 403, i.e. there are matching offers at the worse price, when the volume and price specified by the first one tick worse parameter has been traded, the system returns to the step 401, wherein the second one tick worse parameter is used for generating a new offer specifying another volume, which of course also can be the same volume, at a worse price than the first parameter. The procedure is repeated until in the step 403 there is no match. When there no longer is a match the procedure proceeds to a step 405 wherein the procedure returns from where it came.

In a preferred embodiment, the system comprises means for having 8 or more one tick worse parameters for each financial instrument quoted by each market maker. This supports that the volume in the order book will increase and that the market maker can take the risk to have a tight spread, but still have large volume in the order book at a worse price. If the counter part still indicates that it wants to buy more after the eighth parameter has been executed the procedure will continue to offer a worse price with the same volume specified in the eighth parameter until the price is zero.

The step up parameter is a parameter indicating that new volume at the same price should be generated if the total volume is below the minimum volume specified by the exchange. The step up parameter can also indicate that the one tick worse parameter should be used to generate new volume. This can for example be the case if there is a need for a large volume. The one tick worse parameter can also be used if the step up parameter has generated more volume at the same price for a predefined number of times.

The method and system as described herein makes it possible for a market maker to act differently with respect to different counterparts. This makes the risks which the market maker has to take lower, and therefore the market maker can reduce the spread, which in turn will increase the attraction on investors.

Thus, by using a function that supports that market makers through pre-defined parameters will have new orders generated by the system and that a market maker can act differently with respect to different counterparts. The parameters specify if a market maker should add extra volume on an existing price or generate a new order at a worse price. In order to make it possible for market makers to have a very tight spread without forcing them to take larger risks, additional logic is used when matching orders. The algorithm as described herein protects the market makers in certain situations and gives market makers the possibility to have a tight spread without taking a large risk. The algorithm also supports that the market makers can take the risk to quote large volumes.

What is claimed is:

1. An automated exchange system for matching a bid and offer between a buyer and a seller, wherein one of the buyer or the seller is a market maker on the exchange and the other of the buyer or the seller is an investor, comprising:

means for receiving a quote for the market maker;

means for receiving an order on the exchange for the investor and identifying the investor as a type of counterpart of the market maker, wherein the type of counterpart is one of a plurality of types, and wherein each type corresponds to one of a plurality of distinct relationships between the investor and the exchange;

means for executing the matching between the quote from the market maker and the order for the investor according to at least one of at least two different matching schemes in response to the type of counterpart identified;

means for generating a revised quote for the market maker according to at least one of at least two different quote generating schemes in response to the type of counterpart; and means for executing a further matching between the revised quote and the order entered for the investor.

2. A system according to claim 1 wherein the investor is a second market maker not on the exchange and further comprising means for delaying the matching and further matching during a predetermined period of time.

3. A system according to claim 2, further comprising means connected to the delay means for executing the matching and further matching if the selling price and the buying price still indicate a match after the predetermined period of time has elapsed.

4. The exchange according to claim 1, wherein the plurality of types includes a customer of the exchange, a firm that is not on the exchange, and a second market maker that is a market maker on another exchange.

5. The exchange according to claim 4, wherein, when the type of counterpart identified is the firm, then a volume of the bid and offer is limited to a firm volume.

6. A method of matching a bid and an offer between a buyer and a seller in an automated exchange system, wherein one of the buyer or the seller is a market maker on the exchange and the other of the buyer or the seller is an investor, comprising the steps of:

receiving a quote from a market maker;

receiving an order on the exchange for the investor and identifying the investor as a type of counterpart, wherein the type of counterpart is one of a plurality of types, and wherein each type corresponds to one of a plurality of distinct relationships between the exchange and the investor;

executing the matching between the quote from the market maker and the order for the investor according to at least one of at least two different matching schemes in response to the type of counterpart identified;

generating a revised quote for the market maker according to at least two different quote generating schemes in response to the type of counterpart identified; and executing a further matching between the revised quote and the order entered for the investor.

7. The method according to claim 6, wherein the investor is a market maker not on the exchange, comprising the further step of:

delaying the matching and the further matching during a predetermined period of time.

8. The method according to claim 7, further comprising executing the matching and the further matching if the selling price and the buying price still indicate a match after the predetermined period of time has elapsed.

9. An automated exchange adapted to match bids and offers between an investor and a market maker on the exchange, the exchange comprising:

means for receiving an order from the investor, wherein the order identifies a relationship between the investor and the exchange;

means for determining a counterpart type of the investor, wherein the counterpart type is one of a plurality of types, and wherein each type corresponds to one of a plurality of distinct relationships between the investor and the exchange;

means for executing an algorithm to make the match wherein the algorithm is based on a selected exchange parameter, and for generating a quote on behalf of the market maker, wherein the size of the quote depends on the selected exchange parameter; and a storage device adapted to store a plurality of exchange parameters and to select one of the exchange parameters as the selected exchange parameter based on the counterpart type of the investor identified by the means for determining.

10. The automated exchange of claim 9, wherein the investor is a second market maker not on the exchange.

11. The automated exchange of claim 10, wherein the system is further adapted to introduce a delay for a predetermined period of time prior to executing the match.

* * * * *

UNITED STATES PATENT AND TRADEMARK OFFICE
CERTIFICATE OF CORRECTION

PATENT NO.   : 6,405,180 B2
DATED        : June 11, 2002
INVENTOR(S)  : Jan Tilfors and Gary Katz It is certified that error appears in the above-identified patent and that said Letters Patent is hereby corrected as shown below:

Column 4,
Line 40, delete "step a" and insert -- a step -- therefor;

Column 6,
Lines 4 and 6, delete "marker" and insert -- market -- therefor.

Signed and Sealed this

Third Day of May, 2005

JON W. DUDAS
*Director of the United States Patent and Trademark Office*